(12) United States Patent
Kim et al.

(10) Patent No.: US 6,885,544 B2
(45) Date of Patent: Apr. 26, 2005

(54) VERTICAL CAPACITOR APPARATUS, SYSTEMS, AND METHODS

(75) Inventors: Hyunjun Kim, Chandler, AZ (US); Jiangqi He, Gilbert, AZ (US); Joong-Ho Kim, Phoenix, AZ (US); Dong-Ho Han, Pheonix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/669,678

(22) Filed: Sep. 24, 2003

(65) Prior Publication Data

US 2005/0063137 A1 Mar. 24, 2005

(51) Int. Cl.[7] .............................................. H01G 4/06
(52) U.S. Cl. .............................. 361/321.1; 361/321.5; 361/301.2; 361/306.1; 361/306.3; 361/311; 361/313

(58) Field of Search ................. 361/321.1, 321.2, 361/321.5, 301.2, 301.4, 306.1, 306.3, 307, 308.1, 310, 311, 313, 312, 321.3, 329.33

(56) References Cited

U.S. PATENT DOCUMENTS

| | | | | |
|---|---|---|---|---|
| 5,317,309 A | * | 5/1994 | Vercellotti et al. | 340/10.5 |
| 5,880,925 A | * | 3/1999 | DuPre et al. | 361/303 |
| 6,385,033 B1 | * | 5/2002 | Javanifard et al. | 361/306.2 |
| 6,587,327 B1 | * | 7/2003 | Devoe et al. | 361/306.3 |
| 6,597,562 B1 | * | 7/2003 | Hu et al. | 361/306.3 |

\* cited by examiner

Primary Examiner—Chau N. Nguyen
Assistant Examiner—Nguyen T. Ha
(74) Attorney, Agent, or Firm—Schwegman, Lundberg, Woessner & Kluth, P.A.

(57) ABSTRACT

An apparatus and system, as well as fabrication methods therefor, may include a plurality of vertically-oriented plates separated by dielectric layers, wherein the vertically-oriented plates include a plurality of terminals coupled to a bottom side of the plates.

19 Claims, 5 Drawing Sheets

VERTICAL CAPACITOR APPARATUS, SYSTEMS, AND METHODS

TECHNICAL FIELD

The subject matter relates generally to apparatus, systems, and methods used in conjunction with circuit elements, including those used to store energy, such as capacitors.

BACKGROUND INFORMATION

Capacitive energy storage devices may be assembled into component packages. Typically, such capacitors are constructed by forming a vertically-stacked sandwich comprising several layers of horizontal conductive plates and a dielectric material. The amount of capacitance provided typically increases in direct proportion to the horizontal plate area.

Modern circuitry designs emphasize increased functionality at higher clock speeds. Bypass capacitors may thus be called upon to provide a power supply smoothing function using increased amounts of capacitance. However, the increased horizontal plate area required may be at odds with an engineering emphasis on smaller device packaging, including the increased horizontal circuit area required to accommodate larger bypass capacitors.

DETAILED DESCRIPTION

The term "horizontal", for the purposes of this document, describes a direction which may include, or be parallel to, the substantially planar surface of a circuit board to which electronic components, including capacitors, are mounted. The term "vertical" refers to a direction which is substantially perpendicular to the horizontal direction. For example, the angle measured between the "vertical" side of a component and the circuit board surface to which the component is mounted should measure between about 80 degrees to about 100 degrees, being typically about 90 degrees.

Some embodiments may comprise a capacitor having a plurality of vertical plates separated by one or more dielectric layers. Terminals may be connected to the plates along one side of the structure, typically the bottom side, which is a side of the plate bounding its surface area and proximate to a circuit board or other surface to which the capacitor may be attached. By constructing a capacitor in this manner, the planar area of the plates can be increased without affecting the horizontal surface area required to mount the capacitor. This is because the planar area of the plates extends in a vertical, rather than a horizontal direction. Thus, it is possible for such embodiments to provide increased capacity with a substantially constant horizontal form factor.

Figure 1A:
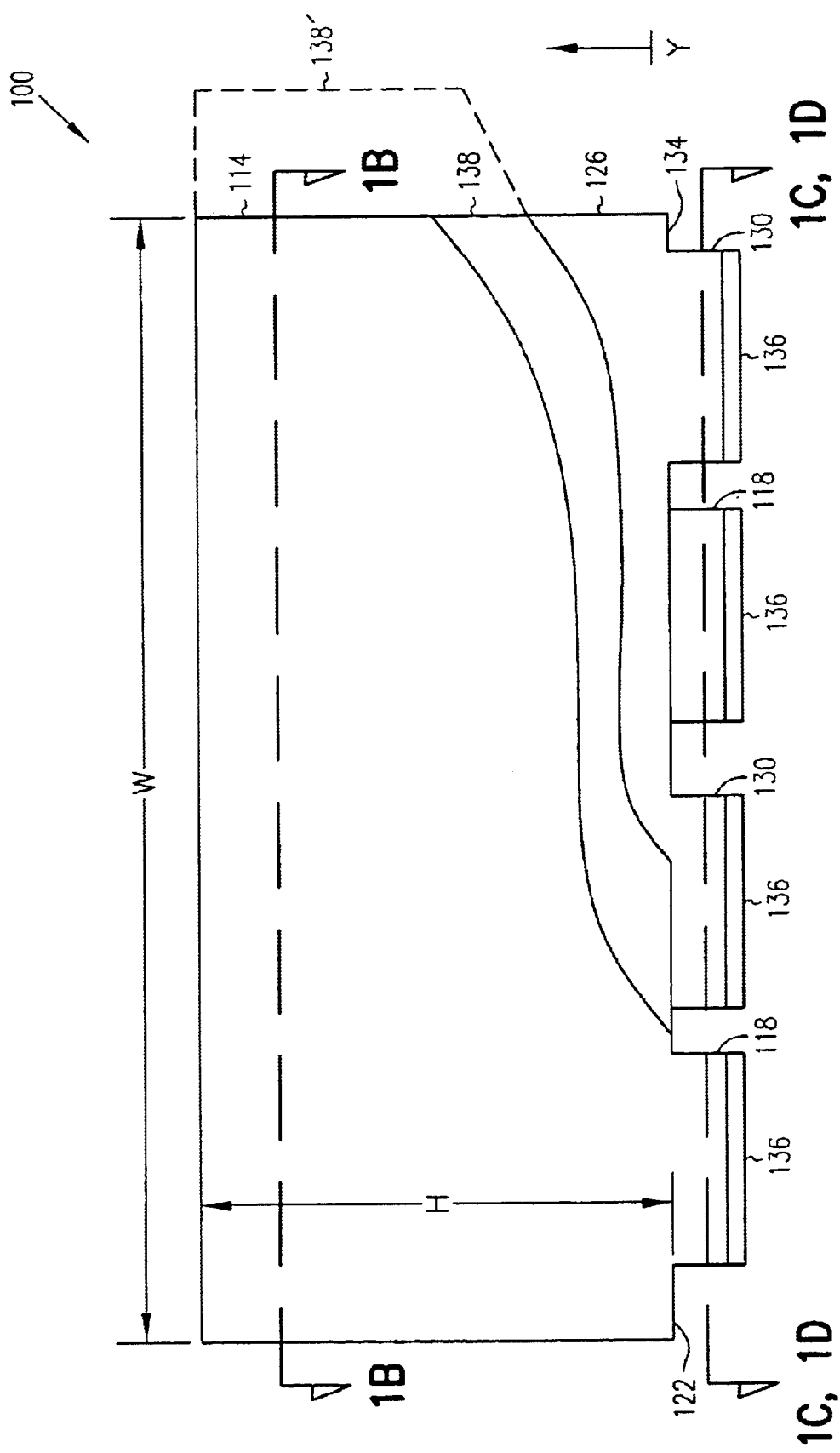
FIG. 1A is a side cut-away view of an apparatus according to various embodiments.
Figure 1B:
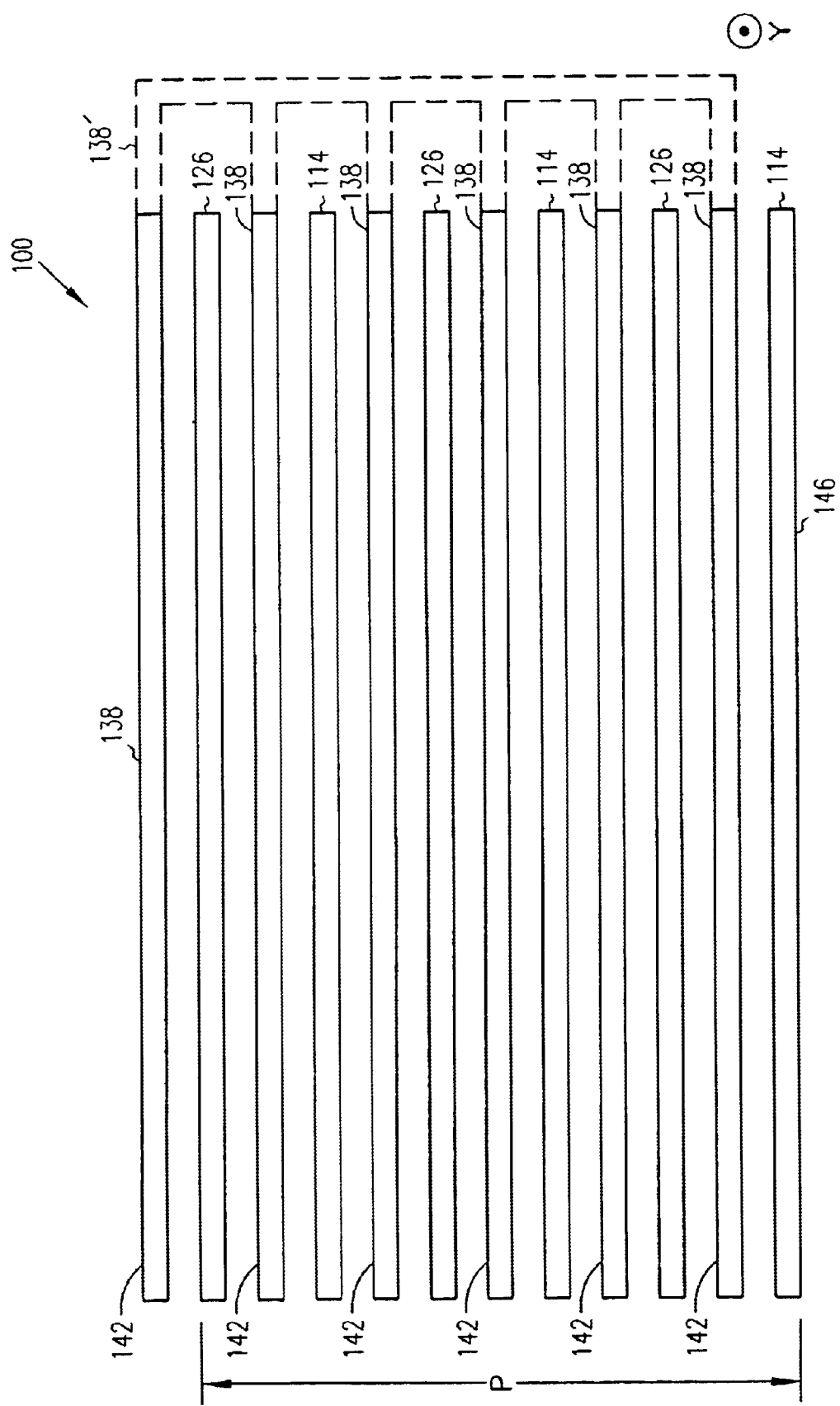
FIG. 1B is an exploded top view of an apparatus according to various embodiments.

FIG. 1A is a side cut-away view of an apparatus 100 according to various embodiments. FIG. 1B is an exploded top view of the apparatus 100 according to various embodiments.

In some embodiments, an apparatus 100 may comprise one or more first vertically-oriented plates 114 having one or more first terminals 118 coupled to a first bottom side 122 of the first vertically-oriented plates 114. The apparatus may also comprise one or more second vertically-oriented plates 126 having one or more second terminals 130 coupled to a second bottom side 134 of the second vertically-oriented plates 126. The apparatus 100 may include one or more dielectric bodies 138, 138'. The terminals 118, 130 may be coupled to pads 136.

In some embodiments, the dielectric bodies 138 may form individual layers, such that the first vertically-oriented plates 114 and the second vertically-oriented plates 126 are spaced apart and disposed adjacent at least one of the dielectric bodies 138.

In some embodiments, a unitary dielectric body 138' may be included within which the first vertically-oriented plate(s) 114 and the second vertically-oriented plate(s) 126 are spaced apart and partially disposed. Thus, the apparatus 100 may also comprise a plurality of first vertically-oriented plates 114 coupled to a first terminal 118, and a plurality of second vertically-oriented plates 126 coupled to a second terminal 130, wherein the plurality of first vertically-oriented plates 114 and the plurality of second vertically-oriented plates 126 are spaced apart and partially disposed within the unitary dielectric body 138'.

Therefore, in some embodiments, the apparatus 100 may be constructed so that a plurality of dielectric bodies 138 are disposed adjacent the vertically-oriented plates 114, 126. For example, the vertically-oriented plate 146 is shown as adjacent the dielectric body 138, but not partially disposed within the dielectric body 138. Therefore, in some embodiments, an apparatus 100 may include a plurality of vertically-oriented plates 114, 126 separated by one or more dielectric bodies 138, which may be layered, wherein the vertically-oriented plates 114, 126 include a plurality of terminals 118, 130 coupled to the bottom sides 122, 134 of the plates 114, 126. In some embodiments, the apparatus 100 may be constructed so that the plates 114, 126 are partially disposed within a unitary dielectric body 138'.

The vertically-oriented plates 114, 126 may take any number of forms, comprising innumerable aspect ratios (i.e., ratio of height H to width W). Thus, for example, the first vertically-oriented plates 114 and the second vertically-oriented plates 126 can be designed to have a height H in the vertical direction Y that is greater than a horizontal thickness T of the apparatus, including a combined thickness of the first vertically-oriented plates and the second vertically-oriented plates P (see FIGS. 1C and 1D).

The vertically-oriented plates 114, 126 may be substantially planar, corrugated, and/or perforated. As shown in FIG. 1A, the vertically-oriented plates 114, 126 may also be substantially rectangular.

Figure 1C:
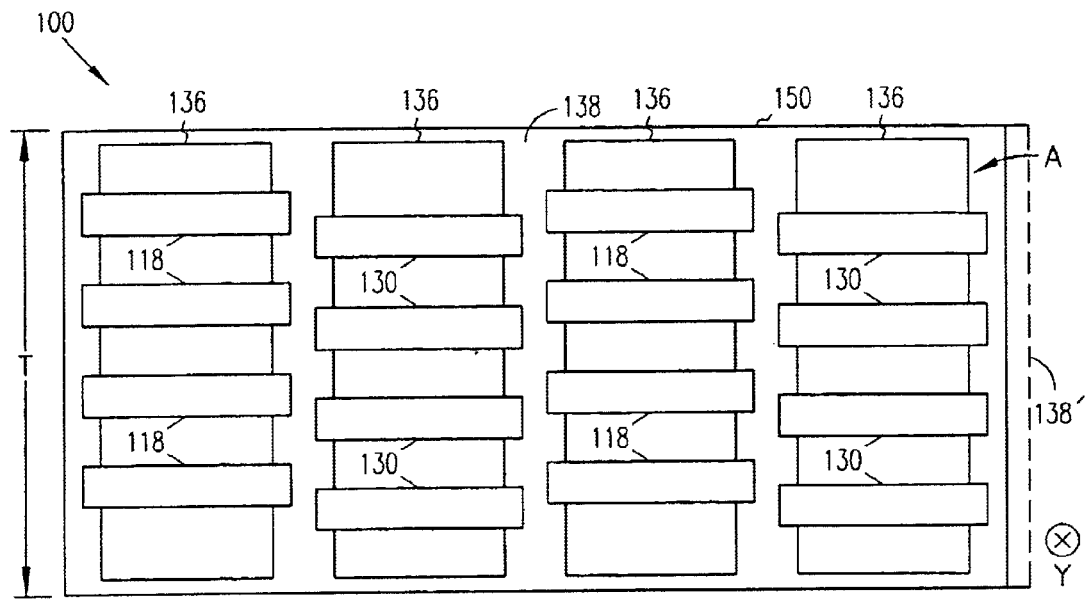
FIGS. 1C and 1D are bottom views of an apparatus having four and eight terminals, respectively, according to various embodiments.
Figure 1D:
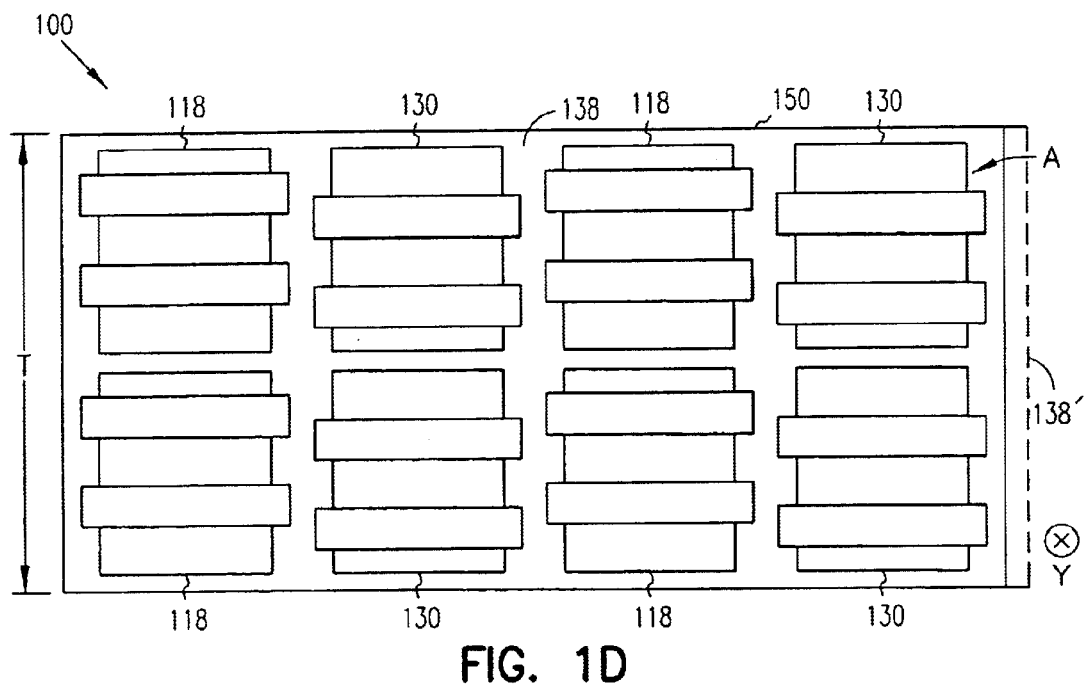

FIGS. 1C and 1D are bottom views of an apparatus 100 having four and eight pads 136, respectively, according to various embodiments. In FIGS. 1C and 1D, some of the terminals 118 are coupled to one pad 136, and others of the terminals 118 are coupled to another pad 136. Similarly, some of the terminals 130 are coupled to one pad 136, and others of the terminals 130 are coupled to another pad 136. In FIG. 1C, there are four pads 136. In FIG. 1D, there are eight pads 136. Of course, any number of terminals 118, 130 and pads 136 may be used and coupled together in this manner. In some embodiments, the vertical surface area (i.e., the height H×width W shown in FIG. 1A) of one or more of the vertically-oriented plates 114, 126 may be more than twice as large as a bottom surface area A of a package 150 housing the first vertically-oriented plates 114, 126 and the dielectric bodies 138, 142.

Figure 2:
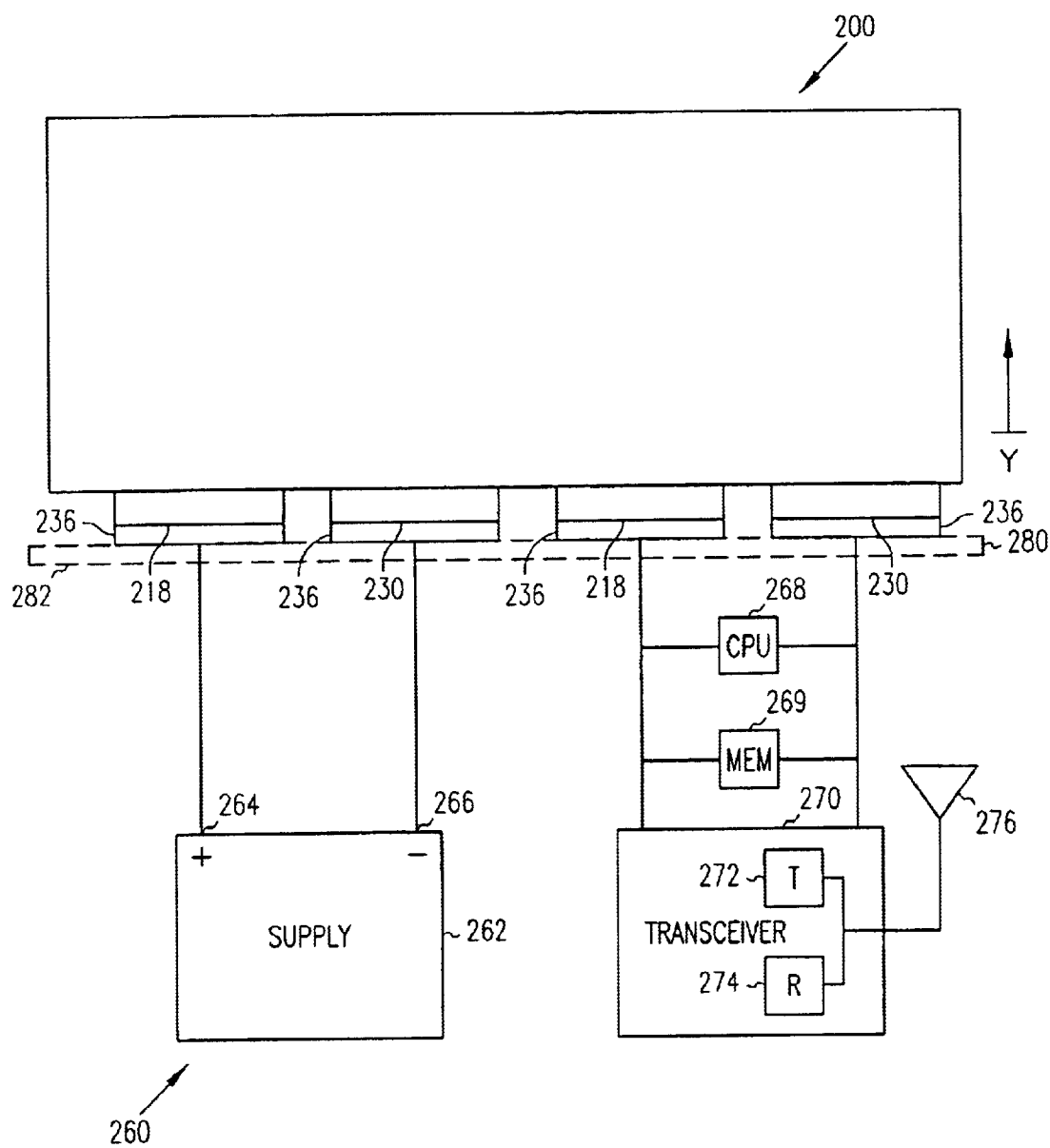
FIG. 2 is a schematic block diagram of an apparatus and a system according to various embodiments.

Still other embodiments may be realized. FIG. 2 is a schematic block diagram of an apparatus 200 and a system 260 according to various embodiments. The system 260 may include a power supply 262 having a source terminal 264 and a return terminal 266, which may in turn be coupled to the apparatus 200 via terminals 218, 230 (and possibly pads 236), as well as to a processor 268, including a digital signal processor and/or a field-programmable gate array (FPGA) capable of executing Boolean logic instructions, and/or a memory 269 (which may be used to store a set of executable instructions, including Boolean logic instructions). The system 260 may also comprise a transceiver 270, including a transmitter 272 and a receiver 274 coupled to the power supply 262. An antenna 276, which may be a monopole antenna, a dipole antenna, an omni-directional antenna, or a patch antenna, among others, may be coupled to the transmitter 272 and/or the receiver 274. The transceiver 270, transmitter 272, and/or receiver 274 may form a portion of a cellular telephone.

The apparatus 200 may be similar to or identical the apparatus 100, and may comprise a capacitor, as described above. The apparatus 200 may be coupled to a circuit board 280, having a planar surface 282, perhaps via the terminals 218 and one or more pads 236. If the planar surface 282 is oriented in a substantially horizontal fashion, then the apparatus 200, including vertically-oriented plates (not shown in FIG. 2), may be oriented in a substantially vertical direction Y with respect to the planar surface 282. If this is the case, the vertically-oriented plates in the apparatus 100 will also be oriented in a substantially vertical direction Y with respect to the planar surface 282. The vertically-oriented plates included in the apparatus 200 may be constructed so as to be substantially flat/planar.

The apparatus 100, 200, vertically-oriented plates 114, 126, terminals 118, 130 bottom sides 122, 134, pads 136, 236, dielectric body 138, dielectric bodies 142, package 150, system 260, power supply 262, source terminal 264, return terminal 266, processor 268, memory 269, transceiver 270, transmitter 272, receiver 274, antenna 276, circuit board 280, and planar surface 282 may all be characterized as "modules" herein. Such modules may include hardware circuitry, and/or a processor and/or memory circuits, software program modules and objects, and/or firmware, and combinations thereof, as desired by the architect of the apparatus 100, 200, and system 260, and as appropriate for particular implementations of various embodiments. For example, such modules may be included in a system operations simulation package, such as a software electrical signal simulation package, a power usage and distribution simulation package, a capacitance-inductance simulation package, a power/heat dissipation simulation package, and/or a combination of software and hardware used to simulate the operation of various potential embodiments.

It should also be understood that the apparatus and systems of various embodiments can be used in applications other than for power supply bypass capacitors, and thus, the illustrated embodiments are not to be so limited. The illustrations of apparatus 100, 200, and systems 260 are intended to provide a general understanding of the elements and structure of various embodiments, and they are not intended to serve as a complete description of all the features of compositions, apparatus, and systems that might make use of the elements and structures described herein.

Applications that may include the novel apparatus and systems of various embodiments include electronic circuitry used in high-speed computers, communication and signal processing circuitry, data transceivers, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Figure 3:
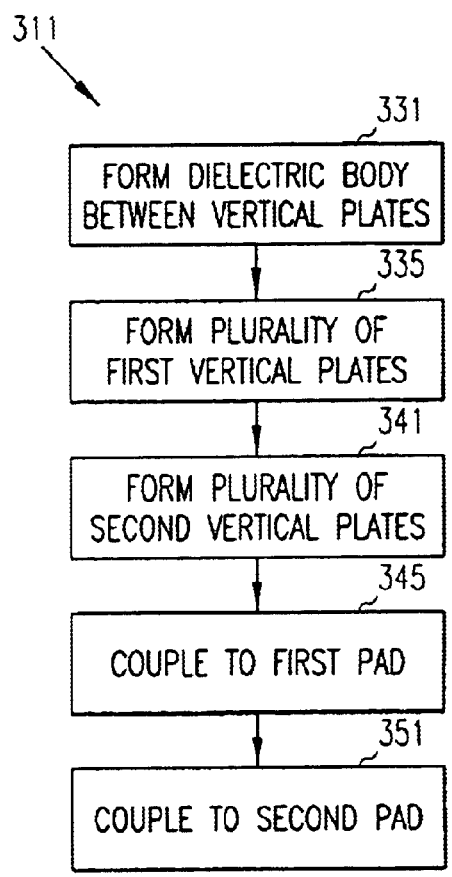
FIG. 3 is a flow chart illustrating several methods according to various embodiments.

Some embodiments include a number of methods. FIG. 3 is a flow chart illustrating several methods 311 according to various embodiments. For example, a method 311 may (optionally) begin at block 331 with constructing a capacitor by forming a dielectric body between a first vertically-oriented plate having a first terminal coupled to a first bottom side, and a second vertically-oriented plate having a second electrical connection to a second bottom side. The method 311 may include forming a plurality of first vertically-oriented plates to couple to a first pad at block 335, and forming a plurality of second vertically-oriented plates to couple to a second pad at block 341. The method 311 may also include coupling the plurality of first vertically-oriented plates to the first pad at block 345, and coupling the plurality of second vertically-oriented plates to the second pad at block 351.

Many different materials can be used to construct various embodiments. For example, the vertically-oriented plates may comprise nickel, among other materials. The dielectric body (or bodies) may comprise a ceramic material, among others.

Figure 4:
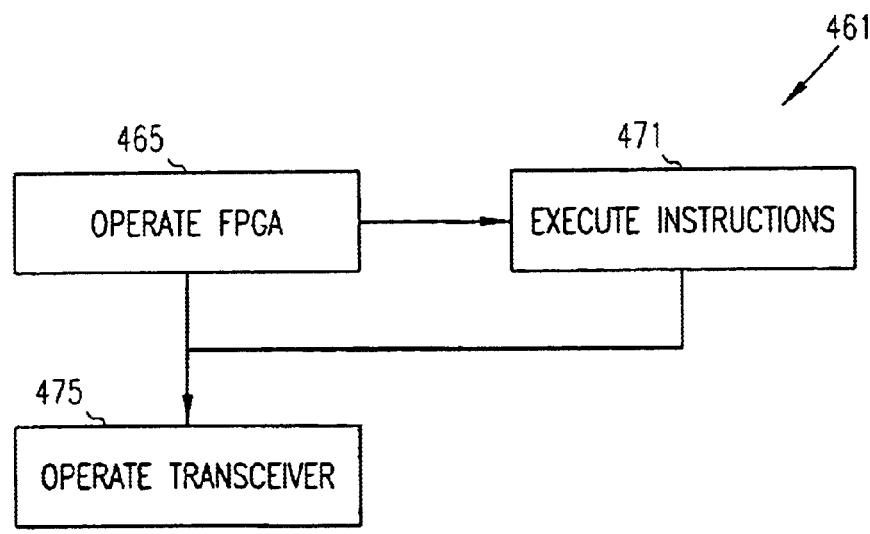
FIG. 4 is a flow chart illustrating several methods according to various embodiments.

Still other embodiments may be realized. FIG. 4 is a flow chart illustrating several methods according to various embodiments. For example, a method 461 may comprise operating an FPGA coupled to an apparatus, such as a capacitor, having a dielectric body disposed between a first vertically-oriented plate having a first terminal coupled to a first bottom side and a second vertically-oriented plate having a second terminal coupled to a second bottom side at block 465. Operating the FPGA may include executing a plurality of Boolean logic instructions at block 471. In some embodiments, the method 461 may include operating a transceiver (perhaps forming a portion of a cellular telephone) coupled to the FPGA at block 475. In some embodiments, a circuit board having a planar surface oriented in a substantially horizontal fashion may be coupled to the capacitor, such that the first and second vertically-oriented plates are oriented in a substantially vertical fashion with respect to the planar surface.

It should be noted that the methods described herein do not have to be executed in the order described, or in any particular order. Moreover, various activities described with respect to the methods identified herein can be executed in serial or parallel fashion.

Improved capacitance versus circuit board area requirements may result from implementing the apparatus, systems, and methods disclosed herein. Capacitors manufactured according to the teachings herein may include pads on the bottom side of their package, while standing vertically, in contrast to currently-available horizontally-stacked capacitors. Since various embodiments permit making a capacitor having a thickness that is much smaller than the package width, circuit board area can be used more efficiently. In addition, the overall series inductance for such devices can be less than conventional capacitors since the loop inductance area created by the position of Vcc and Vss pads may be reduced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. An apparatus, comprising:
   at least one first vertically-oriented plate having a first terminal coupled to a first bottom side;
   at least one second vertically-oriented plate having a second terminal coupled to a second bottom side; and
   a dielectric body, wherein the first vertically-oriented plate and the second vertically-oriented plate are spaced apart and partially disposed within the dielectric body.

2. The apparatus of claim 1, further comprising:
   a plurality of first vertically-oriented plates coupled to the first terminal; and
   a plurality of second vertically-oriented plates coupled to the second terminal, wherein the plurality of first vertically-oriented plates and the plurality of second vertically-oriented plates are spaced apart and partially disposed within the dielectric body.

3. The apparatus of claim 2, wherein the plurality of first vertically-oriented plates and the plurality of second vertically-oriented plates have a height in the vertical direction that is greater than a horizontal thickness of the apparatus including a combined thickness of the plurality of first vertically-oriented plates and the plurality of second vertically-oriented plates.

4. The apparatus of claim 2, wherein the plurality of first vertically-oriented plates and the plurality of second vertically-oriented plates are substantially planar.

5. The apparatus of claim 2, wherein the plurality of first vertically-oriented plates and the plurality of second vertically-oriented plates are substantially rectangular.

6. The apparatus of claim 1, wherein a vertical surface area of the at least one first vertically-oriented plate is more than twice as large as a bottom surface area of a package housing the at least one first vertically-oriented plate, the at least one second vertically-oriented plate, and the dielectric body.

7. The apparatus of claim 1, further comprising:
   a first plurality of pads coupled to the first terminal; and
   a second plurality of pads coupled to the second terminal.

8. An apparatus, comprising:
   at least one first vertically-oriented plate having a first terminal coupled to a first bottom side;
   at least one second vertically-oriented plate having a second terminal coupled to a second bottom side; and
   a dielectric body, wherein the first vertically-oriented plate and the second vertically-oriented plate are spaced apart and disposed adjacent the dielectric body.

9. The apparatus of claim 8, further comprising:
   a plurality of first vertically-oriented plates coupled to the first terminal;
   a plurality of second vertically-oriented plates coupled to the second terminal; and
   a plurality of dielectric bodies, wherein the plurality of first vertically-oriented plates and the plurality of second vertically-oriented plates are spaced apart and adjacent at least one of the plurality of dielectric bodies.

10. The apparatus of claim 8, wherein a vertical surface area of one of the plurality of first vertically-oriented plates is more than twice as large as a bottom surface area of a package housing the plurality of first vertically-oriented plates, the plurality of second vertically-oriented plates, and the plurality of dielectric bodies.

11. The apparatus of claim 8, further comprising:
    a first plurality of pads coupled to the first terminal; and
    a second plurality of pads coupled to the second terminal.

12. The apparatus of claim 8, further comprising:
    a plurality of first vertically-oriented plates coupled to the first terminal; and
    a plurality of second vertically-oriented plates coupled to the second terminal, wherein the plurality of first vertically-oriented plates and the plurality of second vertically-oriented plates are spaced apart and partially disposed within the dielectric body.

13. A system, comprising:
    a power supply having a source terminal and a return terminal;
    a receiver coupled to the power supply;
    an antenna coupled to the receiver; and
    a capacitor having at least one first vertically-oriented plate having a first terminal coupled to a first bottom side and to the source terminal, at least one second vertically-oriented plate having a second terminal coupled to a second bottom side and to the return terminal, and a dielectric body, wherein the first vertically-oriented plate and the second vertically-oriented plate are spaced apart and disposed adjacent the dielectric body.

14. The system of claim 13, wherein the antenna comprises an omni-directional antenna.

15. The system of claim 13, wherein the receiver comprises a portion of a transceiver.

16. The system of claim 13, further comprising:

a circuit board coupled to the capacitor, wherein a planar surface of the circuit board is oriented in a substantially horizontal fashion, and wherein the at least one first vertically-oriented plate and the at least one second vertically-oriented plate are oriented in a substantially vertical fashion with respect to the planar surface.

17. The system of claim 13, further comprising:

a plurality of first vertically-oriented plates coupled to the first terminal;

a plurality of second vertically-oriented plates coupled to the second terminal; and a plurality of dielectric bodies, wherein the plurality of first vertically-oriented plates and the plurality of second vertically-oriented plates are spaced apart and adjacent at least one of the plurality of dielectric bodies.

18. The system of claim 17, further comprising:

a circuit board coupled to the capacitor, wherein a planar surface of the circuit board is oriented in a substantially horizontal fashion, and wherein the plurality of first vertically-oriented plates and the plurality of second vertically-oriented plates are oriented in a substantially vertical fashion with respect to the planar surface.

19. The system of claim 13, further comprising:

a plurality of first vertically-oriented plates coupled to the first terminal; and a plurality of second vertically-oriented plates coupled to the second terminal, wherein the plurality of first vertically-oriented plates and the plurality of second vertically-oriented plates are spaced apart and partially disposed within the dielectric body.

* * * * *